US006064939A

United States Patent [19]

Nishida et al.

[11] Patent Number: 6,064,939

[45] Date of Patent: May 16, 2000

[54] INDIVIDUAL GUIDANCE SYSTEM FOR AIRCRAFT IN AN APPROACH CONTROL AREA UNDER AUTOMATIC DEPENDENT SURVEILLANCE

[75] Inventors: Masao Nishida; Yasuhiro Taka; Toshikazu Nakajima; Keiichiro Nakaue; Ryuji Otsuka, all of Tokyo; Kakuichi Shiomi, Mitaka; Yoichi Kusui, Kawasaki, all of Japan

[73] Assignees: Oki Electric Industry Co., Ltd.; Ship Research Institute, both of Tokyo; Toshiba Corporation, Kawasaki, all of Japan

[21] Appl. No.: 09/028,778

[22] Filed: Feb. 24, 1998

[30] Foreign Application Priority Data

Feb. 27, 1997 [JP] Japan .................................. 9-043626

[51] Int. Cl.$^{7}$ .......................... G06F 165/00; H04N 7/18

[52] U.S. Cl. .......................... 701/120; 701/14; 244/175

[58] Field of Search ...................... 701/120, 14; 244/175

[56] References Cited

U.S. PATENT DOCUMENTS

| | | | |
|---|---|---|---|
| 5,867,804 | 2/1999 | Pilley et al. | 701/120 |
| 5,890,079 | 3/1999 | Levine | 701/14 |
| 5,904,724 | 5/1999 | Margolin | 701/120 |
| 5,913,912 | 6/1999 | Nishimura et al. | 701/35 |

*Primary Examiner*—Jacques H Louis-Jacques
*Assistant Examiner*—Olga Hernandez

[57] ABSTRACT

An individual guidance system for aircraft in an approach control area under automatic dependent surveillance which, by supplying the pilot with the required flight data automatically in units of micro air spaces, permits safe and accurate flight with little scope for human error, being an individual guidance system for aircraft in an approach control area under automatic dependent surveillance wherein the air-traffic control system divides the approach control area automatically into a group of micro air spaces, and establishes flight rules within the micro air spaces in order to guide aircraft by establishing no-fly air spaces. Then, at such time as a change has occurred in weather conditions or other data within the approach control area, it establishes in real time in the micro air spaces flight rules, estimated time of landing of the aircraft, estimated time when the aircraft will leave the approach control area and other data in such a manner as to reflect those details, and transmits the flight rules automatically to the system of a given aircraft when the aircraft reaches a position which corresponds to the micro air spaces. The air-traffic control system guides the aircraft in question in accordance with the flight rules which it has transmitted to the system of the aircraft, and the pilot pilots the aircraft.

5 Claims, 14 Drawing Sheets

INDIVIDUAL GUIDANCE SYSTEM FOR AIRCRAFT IN AN APPROACH CONTROL AREA UNDER AUTOMATIC DEPENDENT SURVEILLANCE

BACKGROUND TO THE INVENTION

1. Field of the Invention

The present invention relates to an individual guidance system for aircraft under ADS (Automatic Dependent Surveillance) whereby data on the position of the aircraft according to GNSS (Global Navigation Satellite System) are transmitted via AMSS (Aeronautic Mobile Satellite Service) to an air-traffic control system (air-traffic controller's control desk and aircraft data detection device).

2. Description of the Related Art

Hitherto it has been usual for an air-traffic controller to allocate a suitable interval of distance between aircraft (the minimum interval of distance which will allow the aircraft to fly in safety) in order for aircraft to fly in safety without the danger of collision and in order to utilize the air space (a finite area within the sky which is allocated to each air-traffic control body) effectively, and for this purpose ARTS (Automated Radar Terminal System) and similar systems have been employed.

For instance, as FIG. 18 shows, an aircraft 182 within the approach control area (air space within which approach control and terminal control are controlling aircraft in flight), which aims to land on a runway 181 of an airport, flies along a STAR (Standard Terminal Arrival Route: a route which is determined by individual airports and along which arriving aircraft usually fly) to arrive at a final approach fix (point in space in the vicinity of a runway which arriving aircraft must pass through).

In the same way, an aircraft 183 taking off from the runway 181 flies along a SID (Standard Instrument Departure: a route determined by individual airports along which departing aircraft usually fly) to reach its flightpath.

While the individual aircraft are flying along their paths, the approach control area air-traffic controller 184 (a) monitors the radar screen 185 (screen where flight names, positions, altitudes, speeds, courses and other information are displayed), predicts collisions between aircraft on the basis of altitude, speed, course and other factors, and gives instructions by voice communication to the pilot of the aircraft in question in order to avoid such a situation; and (b) the air-traffic controller 184 monitors the approach control area on the radar screen 185, and gives instructions by voice communication to the pilot of the aircraft in question, prior to its entering the next air space it is due to fly through (in the case of departing aircraft, the air spaces known as sectors which are controlled by air-traffic control; in the case of arriving aircraft, the airport control air space) with regard to changes in altitude, speed and course in order to maintain a distance between aircraft such as is safe and permits the most effective use of the air space.

However, with the conventional method of approach control area control as described above, near misses between aircraft (abnormally close encounters at distances less than those which considerations of safety demand that the aircraft take) and other incidents continue to occur. In other words, there are cases where there is still the likelihood of human error in the judgment of air-traffic controllers, and investigations have shown that this judgment places a considerable weight of responsibility on air-traffic controllers.

Moreover, the amount of air traffic is constantly on the increase, and the potential for human error is expected to rise in proportion to this, or even to outstrip it. It is therefore becoming more and more difficult to predict collisions between aircraft and keep them at a suitable distance, and there are fears that it may prove impossible to maintain standards of safety.

In addition, there is the concept of free flight which is currently the subject of heated debate in the USA. Whereas at present aircraft are allowed to fly only on standard routes, the concept of free flight involves allowing them to fly freely though the air space provided that no collision between aircraft is anticipated. According to this concept, arriving aircraft enter the approach control area from all directions, and it is anticipated that departing aircraft will also do so with a fair degree of freedom after take-off. Consequently, since aircraft will fly through the approach control area also with a certain degree of freedom, the number of flightpaths will increase markedly, and it will become exceedingly difficult to predict collisions between aircraft by human judgment, and to maintain a suitable distance between them until they enter the next air space. For this reason there is urgent need for countermeasures.

It is an object of the present invention, which the authors have designed in view of the situation outlined above, to provide an individual guidance system for aircraft in an approach control area under automatic dependent surveillance which, by supplying the required flight data automatically in units of micro air spaces, permits safe and accurate flight with little scope for human error.

SUMMARY OF THE INVENTION

In order to attain the above-mentioned object, the present invention is:

[1] An individual guidance system for aircraft in an approach control area under automatic dependent surveillance wherein the air-traffic control system divides the approach control area automatically into a group of micro air spaces on starting the operation of the system, and establishes flight rules within the micro air spaces in order to guide aircraft by establishing no-fly air spaces. Then, at such time as a change has occurred in weather conditions or other data within the approach control area, it establishes in real time in the micro air spaces flight rules, estimated time of landing of the aircraft, estimated time when the aircraft will leave the approach control area and other data in such a manner as to reflect those details, and transmits the flight rules automatically to the system of a given aircraft when the aircraft reaches a position which corresponds to the micro air spaces. The air-traffic control system guides the aircraft in question in accordance with the flight rules which it has transmitted to the system of the aircraft, and the pilot pilots the aircraft.

[2] An individual guidance system for aircraft in an approach control area under automatic dependent surveillance as described in [1] above, wherein at such time as within the approach control area a pilot transmits details of an emergency situation or an air-traffic controller notices any abnormality in relation to that aircraft, the flight rules are re-established by inputting the aircraft identification code in such a manner that it is possible to allocate priority to the aircraft in question and to guide it.

[3] An individual guidance system for aircraft in an approach control area under automatic dependent surveillance as described in [1] above, having a GUI whereby at such time as within the approach control area there is a new air space which must not be entered, the air-traffic controller establishes a no-fly area, together with the times at which it becomes and ceases to be a no-fly area, by operating a no-fly area establishment control element and surrounding a given area with a rectangle or other shape.

[4] An individual guidance system for aircraft in an approach control area under automatic dependent surveillance as described in [1] above, having a GUI whereby surrounding a given air space with a shape by operating a flight rule reference control element allows the air-traffic controller to refer to the flight rules which have been established in each micro air space which lies within that shape.

[5] An individual guidance system for aircraft in an approach control area under automatic dependent surveillance as described in [1] above, having a GUI whereby selecting an aircraft within the approach control area on an aircraft position surveillance screen allows the air-traffic controller to refer to the flight rules which have been established in the micro air space which the aircraft in question is entering and in the surrounding micro air spaces.

BRIEF DESCRIPTION OF THE DRAWINGS

The foregoing and other objects, features and advantages of the present invention will be better understood from the following description taken in connection with the accompanying drawings, in which:

FIG. 17, including

DESCRIPTION OF THE PREFERRED EMBODIMENTS

There follows a detailed description of the preferred embodiments of the present invention, with reference to the drawings.

The individual guidance system for aircraft in an approach control area under automatic dependent surveillance to which the present invention pertains comprises GNSS, AMSS and similar elements, together with an air-traffic control system and aircraft system.

Figure 1:
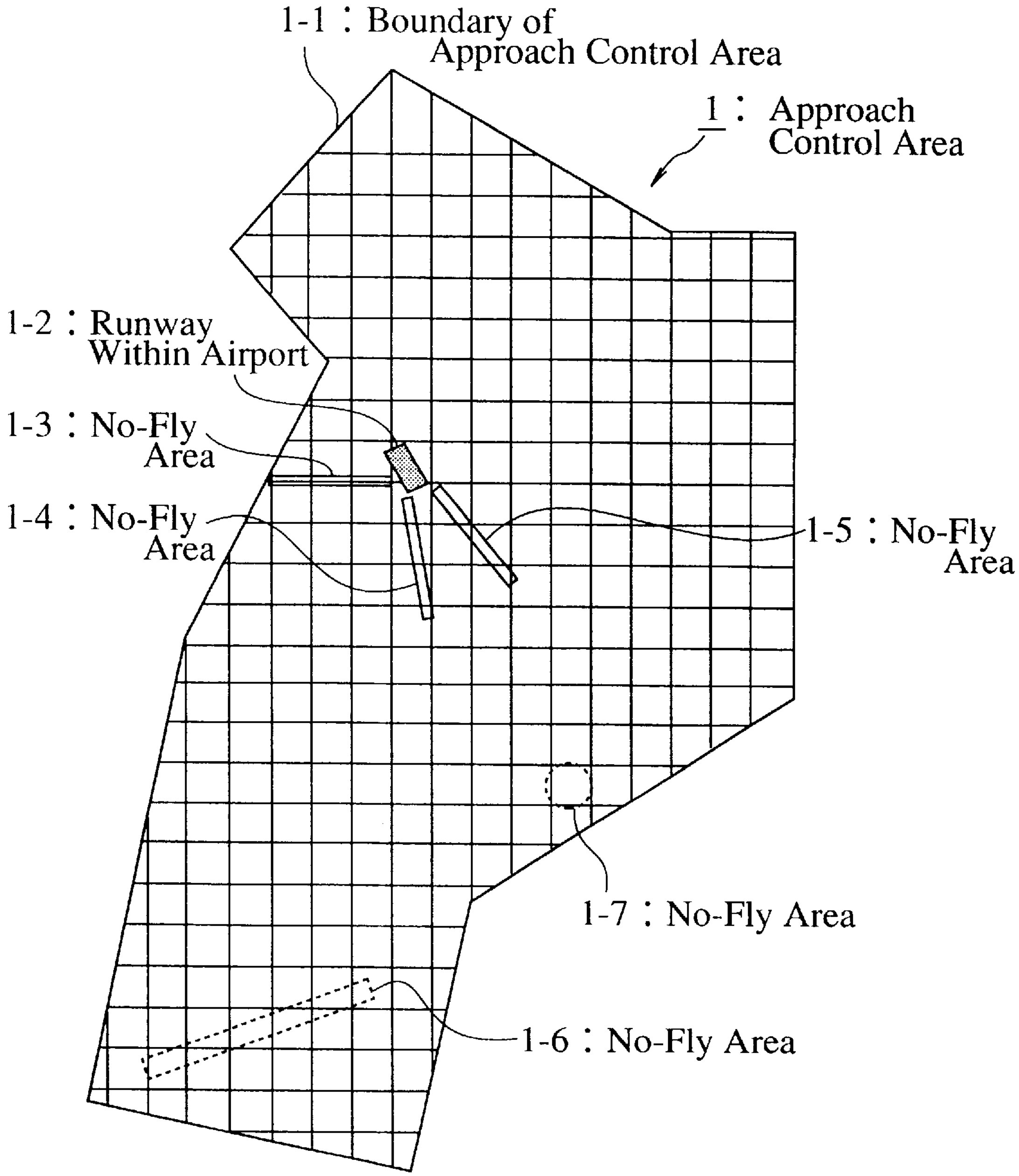
FIG. 1 is an outline explanatory diagram of an approach control area, and depicts an embodiment of the present invention.
Figure 2:
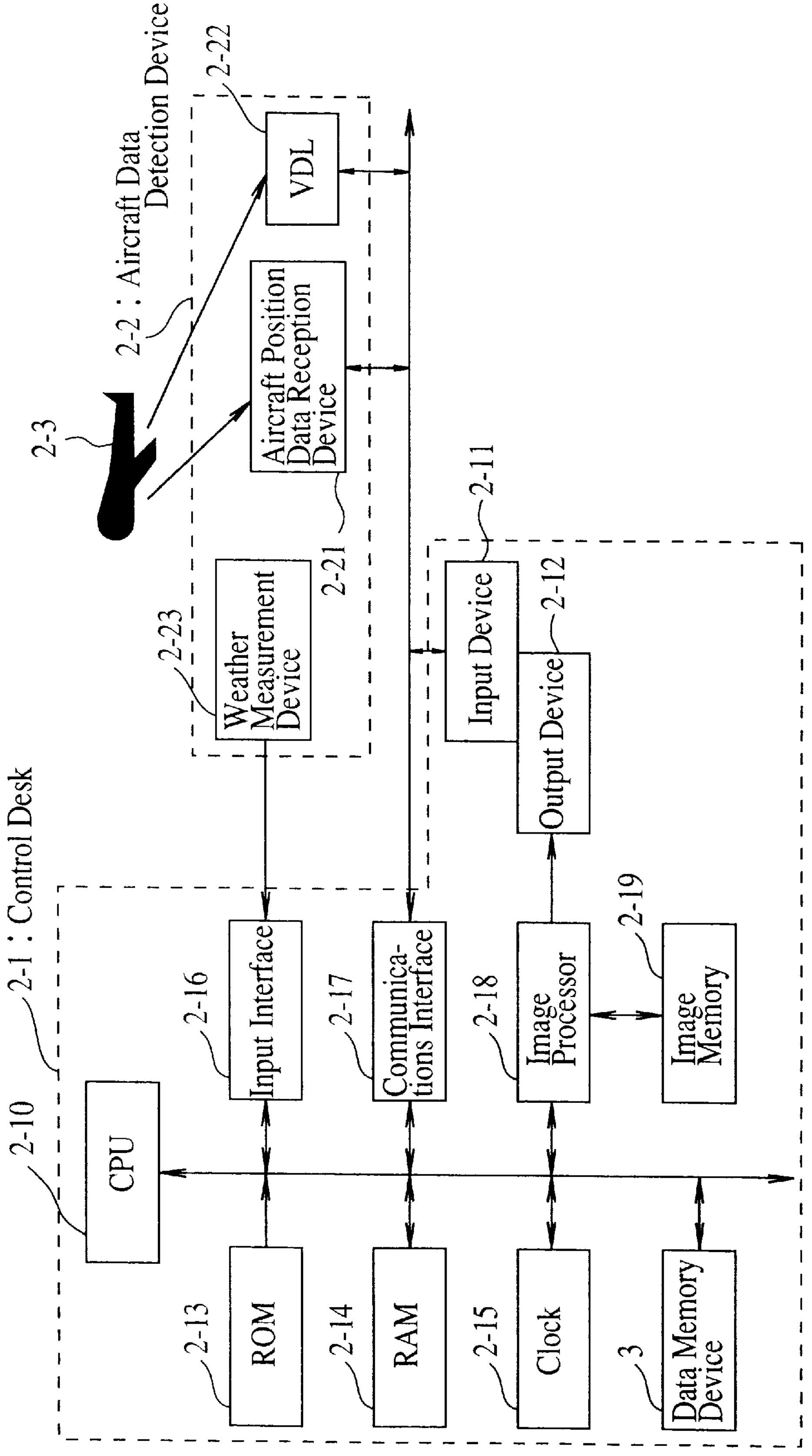
FIG. 2 is an outline explanatory diagram of an approach control area air-traffic control system, and depicts an embodiment of the present invention.
Figure 3:
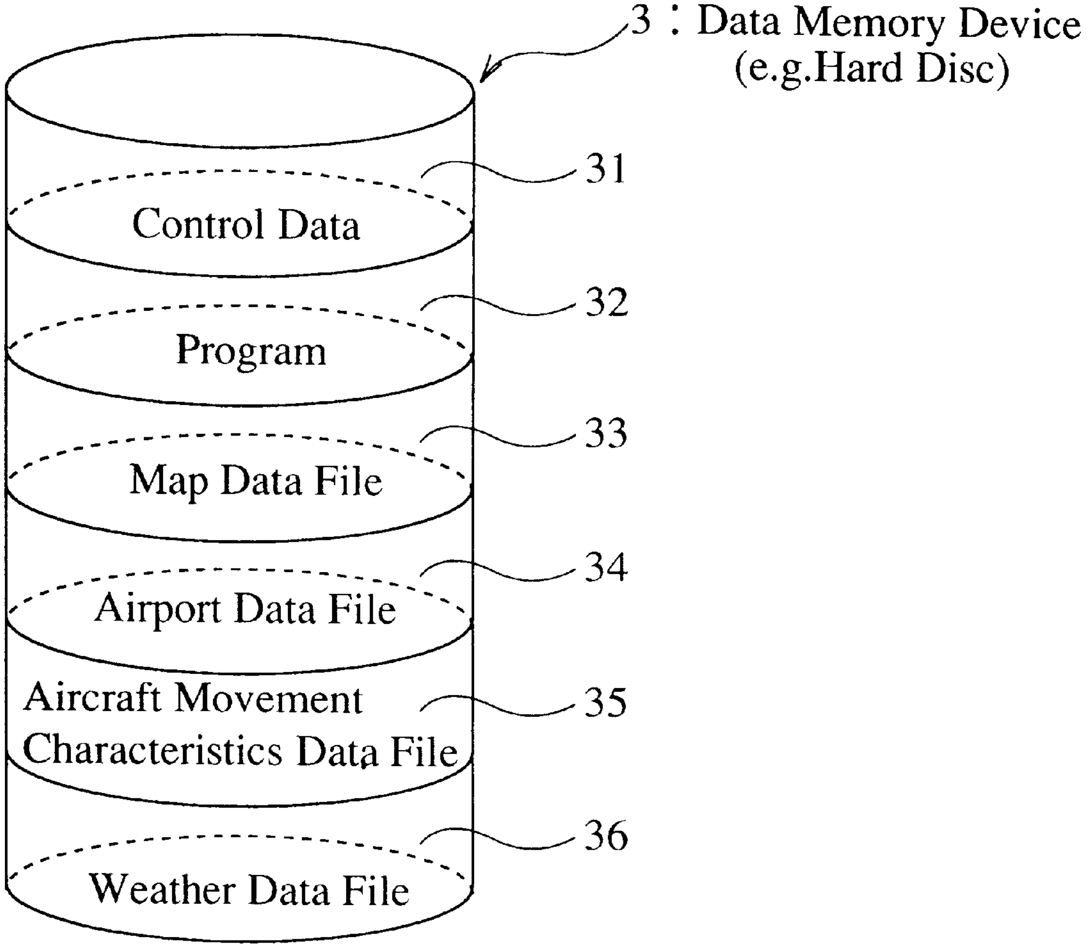
FIG. 3 is a block diagram of a data memory device (e.g., hard disk) in an approach control area air-traffic control system, and depicts an embodiment of the present invention.
Figure 4:
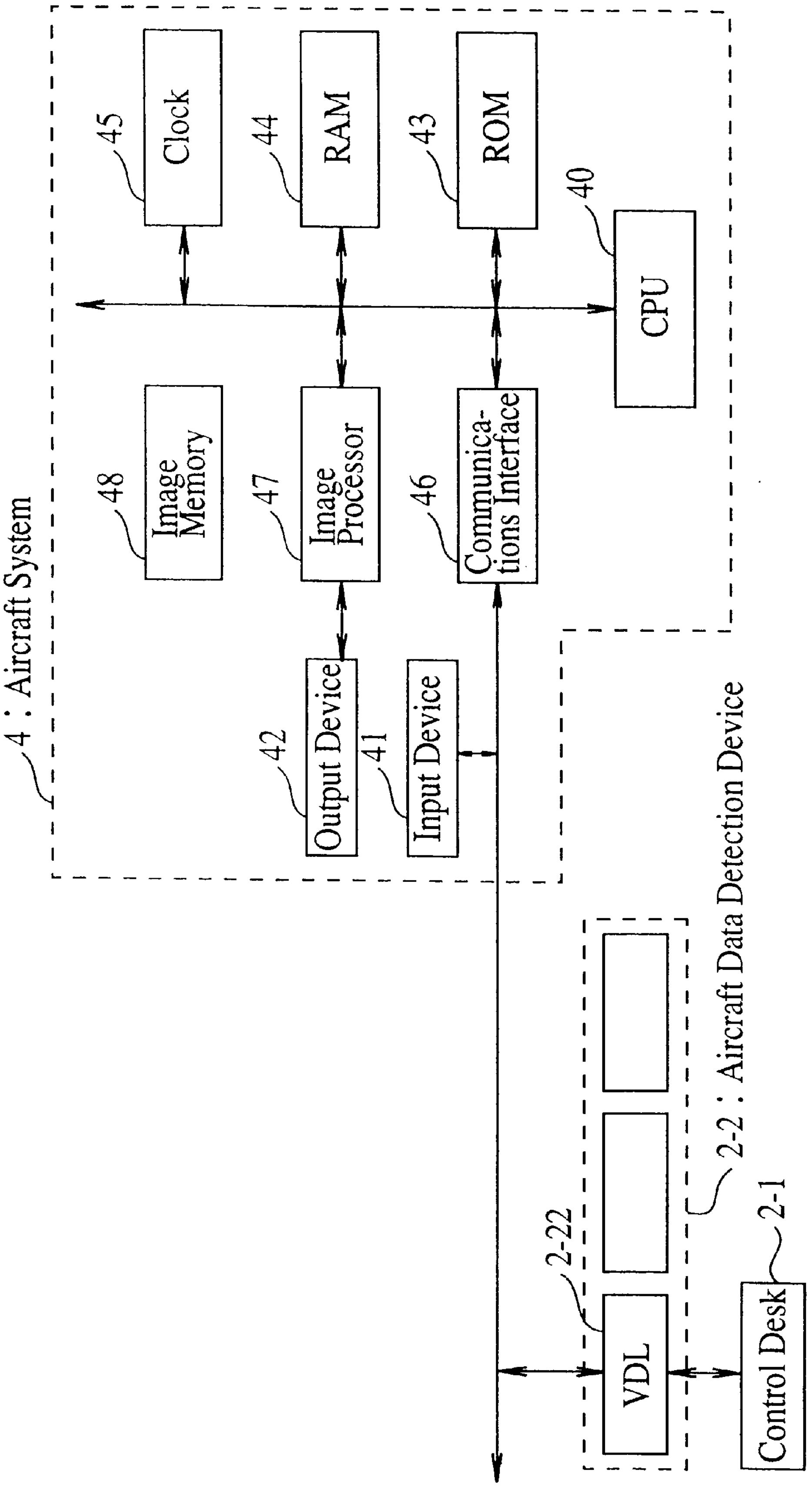
FIG. 4 is a block diagram of an aircraft system, and depicts an embodiment of the present invention.
Figure 5:
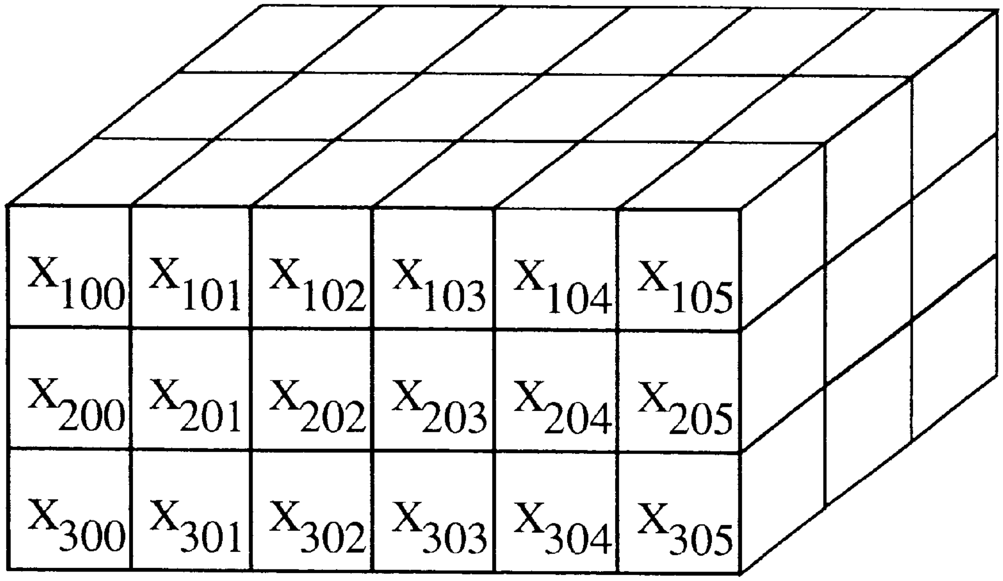
FIG. 5 is an explanatory diagram of a micro air space within the approach control area, and depicts an embodiment of the present invention.
Figure 6:
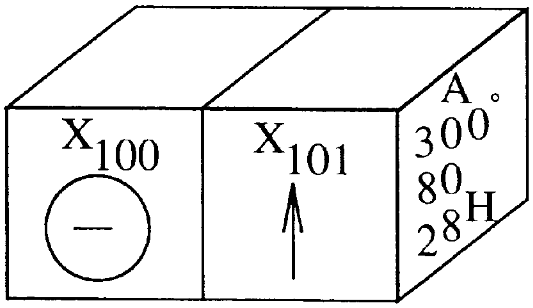
FIG. 6 is a diagram illustrating flight rules for the micro air space within the approach control area, and depicts an embodiment of the present invention.

FIG. 1 is an outline explanatory diagram of an approach control area; FIG. 2 is an outline explanatory diagram of an approach control area air-traffic control system; FIG. 3 is a block diagram of a data memory device (e.g., hard disk) in an approach control area air-traffic control system; FIG. 4 is a block diagram of an aircraft system; FIG. 5 is an explanatory diagram of a micro air space within the approach control area; and FIG. 6 is a diagram illustrating flight rules for the micro air space within the approach control area.

In FIG. 1, a reference numeral 1 is an approach control area, 1-1 the boundary of the approach control area, 1-2 a runway within an airport, and 1-3 to 1-7 no-fly areas.

To be more precise, the air spaces 1-3, 1-4, 1-5 denoted by unbroken lines are no-fly areas which are set automatically on start-up by the air-traffic control system on the basis of weather data and aircraft movement characteristics data. The air spaces 1-6 and 1-7 denoted by broken lines are no-fly areas which are set by the air-traffic control system or by an air-traffic controller when it later transpires that they must not be entered, and the situation is different from that which applies to 1-3, 1-4, 1-5.

In FIG. 2, a reference numeral 2-2 is an aircraft data detection device, which comprises among other elements, an aircraft position data reception device 2-21, data relay device (e.g., VDL, GES) 2-22, and weather measurement device 2-23.

The aircraft position data reception device 2-21 receives data from a satellite (not shown in FIG. 2) concerning the positions of aircraft which that satellite has detected, thus providing positional data for an aircraft 2-3. The data relay device (e.g., VDL) 2-22 is a facility for transmitting and receiving data between the aircraft system 4 (cf. FIG. 4) and a control desk 2-1. In the present invention in particular, this facility transmits flight rules for the micro air spaces which are explained below to the aircraft system (cf. FIG. 4), together with fresh data when reset. It also takes the place of the conventional voice communication in relaying data relating to emergency situations, priority flight requests and other items from the pilot. The weather measurement device 2-23 obtains weather data including wind direction, air pressure and temperatures and this is fed to the control desk 2-7.

A reference numeral 2-1 is the control desk which is operated by an air-traffic controller. A reference numeral 2-10 is a CPU, 2-11 an input device, 2-12 an output device, 2-13 a recording medium (e.g., ROM), 2-14 a RAM, 2-15 a clock, 2-16 an input interface, 2-17 a communications interface, 2-18 an image processor 2-18, 2-19 an image memory, and 3 a data memory device (e.g., hard disc).

The CPU 2-10 performs overall calculations and controls of the control desk. The input device 2-11 has an operational element such as a mouse or touch-switch, while the output device 2-12 comprises a screen (or printer) which displays images, a warning device and other elements. The recording medium (e.g., ROM) 2-13 stores programs such as the one which displays data relating to the current position of the aircraft 2-3.

The RAM 2-14 is a memory which memorises data which is input from the input device 2-11 and stores the results of calculations performed by the CPU 2-10 on the basis of this input data. It also stores data which has been read from the communications interface 2-17 and the data memory device (e.g., hard disc) 3. The input interface 2-16 receives data from the aircraft data detection device 2-2 and the data memory device (e.g., hard disc) 3. The communications interface 2-17 inputs and outputs data from the aircraft data detection device 2-2.

In FIG. 3, a reference numeral 3 is the data memory device (e.g., hard disc), which stores control data 31, programs 32, a map data file 33, an airport data file 34, an aircraft movement characteristics data file 35, a weather data file 36, and other information.

The map data in the map data file 33 is the basis for setting the micro air spaces. The overall layout of the approach control area is drawn on the basis of this map data supplemented by airport data from the airport data file 34. To this is added data on aircraft movement characteristics from the aircraft movement characteristics data file 35, wind direction and other weather data from the weather data file 36, and other information to set the no-fly areas from 1-3 to 1-5 (cf. FIG. 1).

To turn to a description of the aircraft system as depicted in FIG. 4, this has a CPU 40, input device 41, output device 42, memory (e.g., ROM) 43, RAM 44, clock 45, communications interface 46, image processor 47, image memory 48 and other elements.

The CPU 40 performs overall calculations and controls of the aircraft system. The input device 41 has an operational element such as a mouse or touch-switch, while the output device 42 comprises a screen (or printer) which displays images, a warning device and other elements. The recording medium (e.g., ROM) 43 stores data such as that relating to the aircraft's current position. The RAM 44 is a memory for storing data input from the input device 41, together with data relating to the aircraft's current position, flight rules and other information. The communications interface 46 inputs data from the flight data detection device 2-2.

ADS is not provided at present, but it is believed that as a result of the plans of FANS (Special Committee on Future Air Navigation Systems), ADS, ATN (Aeronautical Telecommunications Network) and CPDLC (Controller-Pilot Data Link Communication) will be available.

Use of these systems allows data on the position of the aircraft to be displayed on the output device 2-12 (cf. FIG. 2) in real time in the form of an air-traffic control system aircraft position surveillance screen.

The following is a description of a method of controlling the position of aircraft under these conditions.

First, as FIGS. 5 and 6 show, the three-dimensional approach control area 1 (cf. FIG. 1) is divided into micro air spaces (e.g., cubes of which each side is about 5 miles in length): these are not displayed on the aircraft position surveillance screen. Flight rules for the purpose of guiding aircraft are memorised in units of these micro air spaces. This data is communicated to the aircraft system 4 by way of the communications interface 2-17 and data relay device (e.g., VDL) 2-22, and the pilot pilots the aircraft in accordance with this guidance data on the micro air spaces, thus guaranteeing a safe flight.

For instance, clicking the mouse on the input device 2-11 sets air spaces which must not be entered (as shown in FIG. 1) 1-3, 1-4, 1-5 as no-fly areas on the basis of data from the airport data file 34, aircraft movement characteristics file 35 and weather data file 36.

The rectangular area (1-6) and circular area (1-7) denote, for instance, no-fly areas which are set at the discretion of the air-traffic controller by inputting data on air space where a balloon is due to fly or air space in the vicinity of high-rise buildings.

Next, the air-traffic control system amalgamates this and other data such a weather data (e.g., wind direction, wind speed, presence or absence of cumulonimbus clouds) and sets in the form of flight rules in the micro air spaces with data on the most efficient route for arriving aircraft to reach the final approach fix, or for departing aircraft to reach their flightpath. This corresponds to information such as 'Change course to 220 'Change altitude to 15,000 feet', 'Change speed to 13 knots' or 'Switch on collision-prevention lights', which the air-traffic controller has hitherto delivered by word of mouth.

After this, when the aircraft reaches a position corresponding to one of the micro air spaces and the adjoining air spaces (the position of the aircraft is assessed by ADS), the air-traffic control system transmits the relevant flight rules to the aircraft system 4 by way of the data relay device (e.g., VDL) 2-22. When the aircraft reaches the next micro air space, the flight rules set in that micro air space are transmitted to the aircraft system 4. If the aircraft 2-3 is guided in accordance with these transmitted flight rules and the pilot follows the guidance in piloting the aircraft, it is possible for the aircraft to maintain a safe distance from other aircraft, while arriving most efficiently at the final approach fix, and then the runway.

The air-traffic control system resets the flight rules in real time in accordance with weather data and other data such as that input by the air-traffic controller (e.g., air spaces through which a balloon is due to fly, air spaces in the vicinity of high-rise buildings, and other no-fly areas).

As is shown in FIGS. 5 and 6, groups of micro air spaces are formed by dividing the air space, for instance, into groups of cubes $X_{100}$–$X_{305}$ (e.g., 5 miles square). The flight rules are set, for instance, in such a way that micro air space $X_{100}$ is a no-fly area for a given aircraft, while micro air space $X_{101}$ specifies aircraft A, 300 (course), 80 (altitude), 28 (speed).

Figure 7:
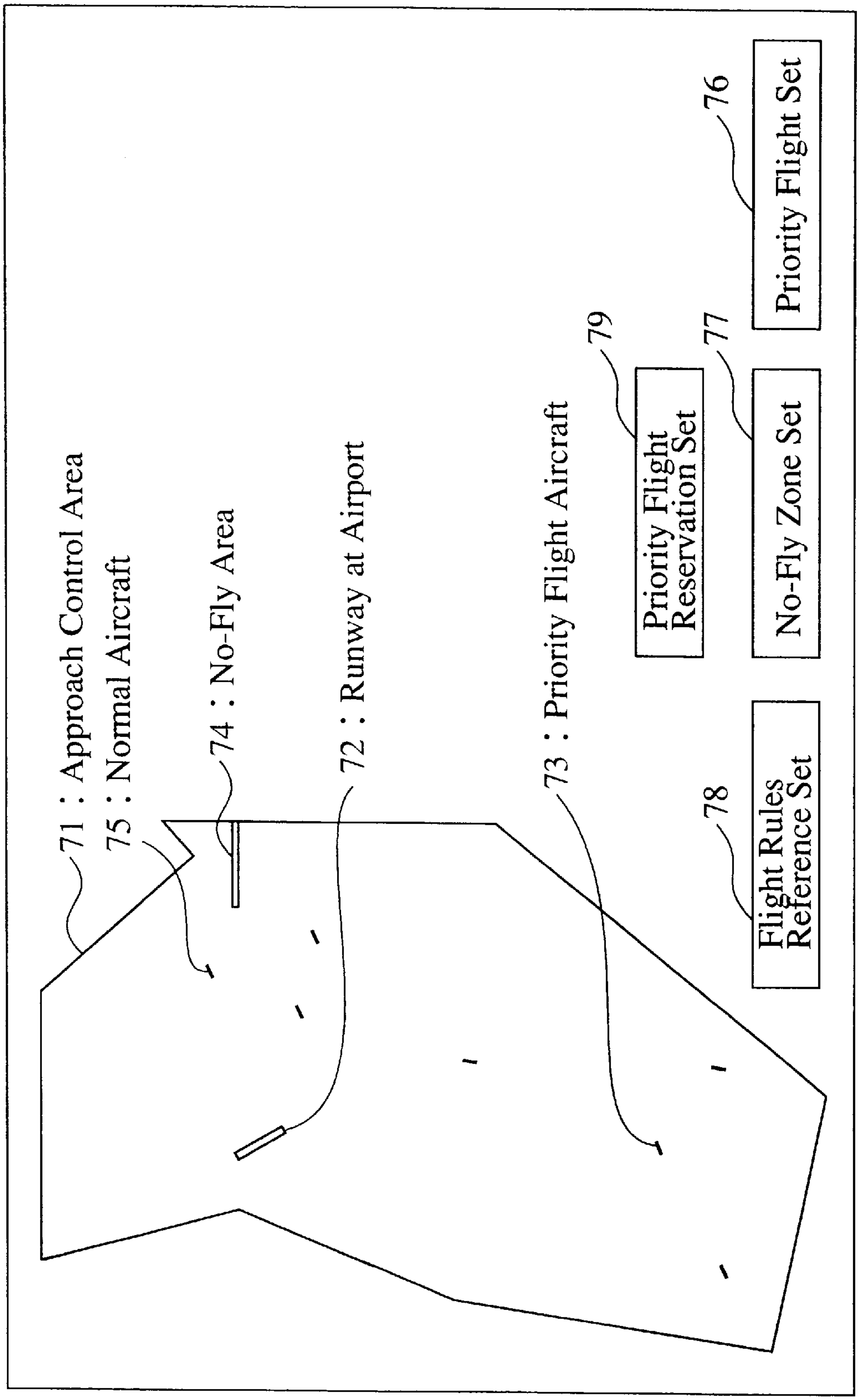
FIG. 7 is a diagram illustrating the screen which forms the output device of the approach control area on the control desk, and depicts an embodiment of the present invention.

FIG. 7 is a diagram illustrating the screen which forms the output device of the approach control area on the control desk, and depicts an embodiment of the present invention.

In FIG. 7, a reference numeral 71 is an approach control area, 72 a runway at an airport, 73 a priority flight aircraft, 74 a no-fly area, and 75 a normal aircraft.

Figure 8:
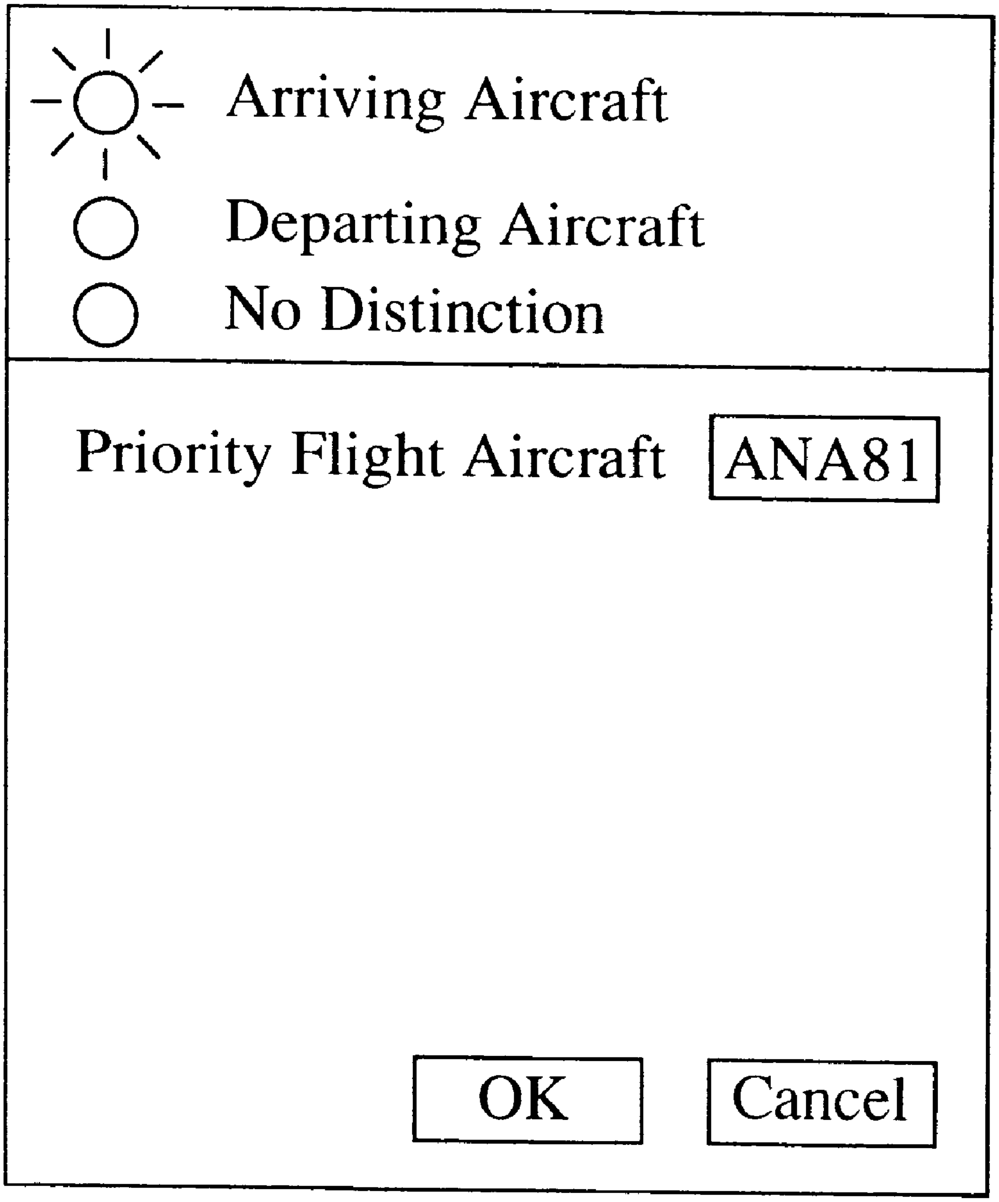
FIG. 8 is a diagram illustrating an example of the display dialogue and other elements whereby the air-traffic controller confirms priority flight settings in the approach control area, and depicts an embodiment of the present invention.

A reference numeral 76 is a priority flight set button, 77 a no-fly zone set button, 78 a flight rules reference set button, and 79 a priority flight reservation set. For instance, if the air-traffic controller operates the priority flight set button 76 and selects an aircraft 73 (e.g., ANA 81), a priority aircraft set confirm dialogue and other information is displayed, as is illustrated in FIG. 8. If he then selects the OK button, the flight rules for all the related micro air spaces are re-set, and the aircraft in question is guided on to the runway 72 on the basis of priority ranking. If the cancel button is selected, the priority flight setting for the aircraft in question is cancelled.

Figure 9:
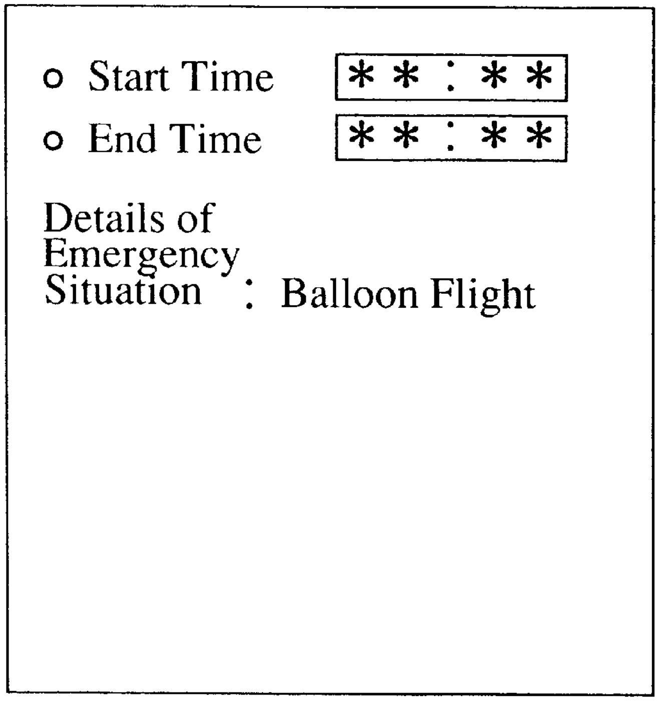
FIG. 9 is a diagram illustrating an example of time-setting for a no-fly area in the approach control area, and a dialogue confirming it, and depicts an embodiment of the present invention.

Moreover, if an emergency situation has arisen in the approach control area, the no-fly area set button 77 is selected, the operational element is operated, and the area 74 is enclosed in a rectangle or other shape. In this manner, as is shown in FIG. 9, the dialogue for setting the time when the no-fly commences, when it ends and other items is displayed. If then the OK button is selected, the flight rules for the related micro air spaces are reset.

By pressing the flight rules reference set button 78 to select part of the approach control area 71, it is possible to refer to the flight rules which have been set in that micro air space and the surrounding air spaces.

Moreover, by pressing the flight rules reference set button 78 and selecting an aircraft in the approach control area 71, it is possible to refer to the flight rules which have been set in the micro air space in which the aircraft in question is, and in the surrounding air spaces.

Figure 10:
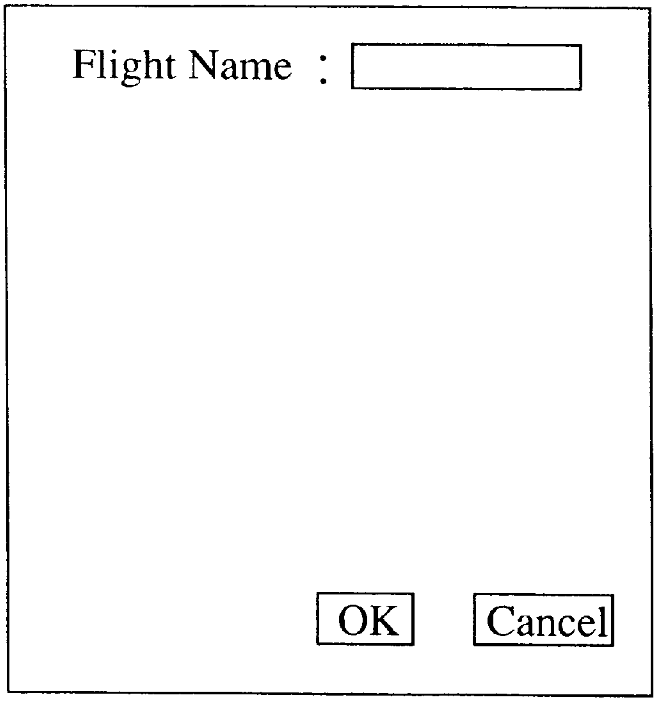
FIG. 10 is a diagram illustrating an example of a display of a reserved flight name, and depicts an embodiment of the present invention.

If a pilot transmits details of an emergency situation from outside the approach control area and the air-traffic controller selects the priority flight reservation set button 79, the screen shown in FIG. 10 is displayed. The aircraft identification code (call sign) is then input from the input device 2-11 (cf. FIG. 2), and the aircraft is confirmed. After confirmation, it is possible to re-set the flight rules in all the related micro air spaces so that when the aircraft in question reaches a position corresponding to a certain micro air space within the approach control area it can be guided with priority ranking.

In this manner, whenever there is any change in weather conditions, the setting of no-fly areas by air-traffic controllers, runway alterations or any other change in data within the air space, the air-traffic control system re-sets the flight rules in the micro air spaces in real time in order that they may reflect the changes. When an aircraft reaches a position corresponding to one of the micro air spaces, the air-traffic control system automatically transmits the flight rules to the aircraft system. The aircraft is guided according to the flight rules which have been transmitted, and the pilot is able to pilot it accordingly.

FIGS. 11, 12, 13, 14, 15 and 16 are examples of input and output devices in the aircraft system which is fitted to the aircraft.

Figure 11:
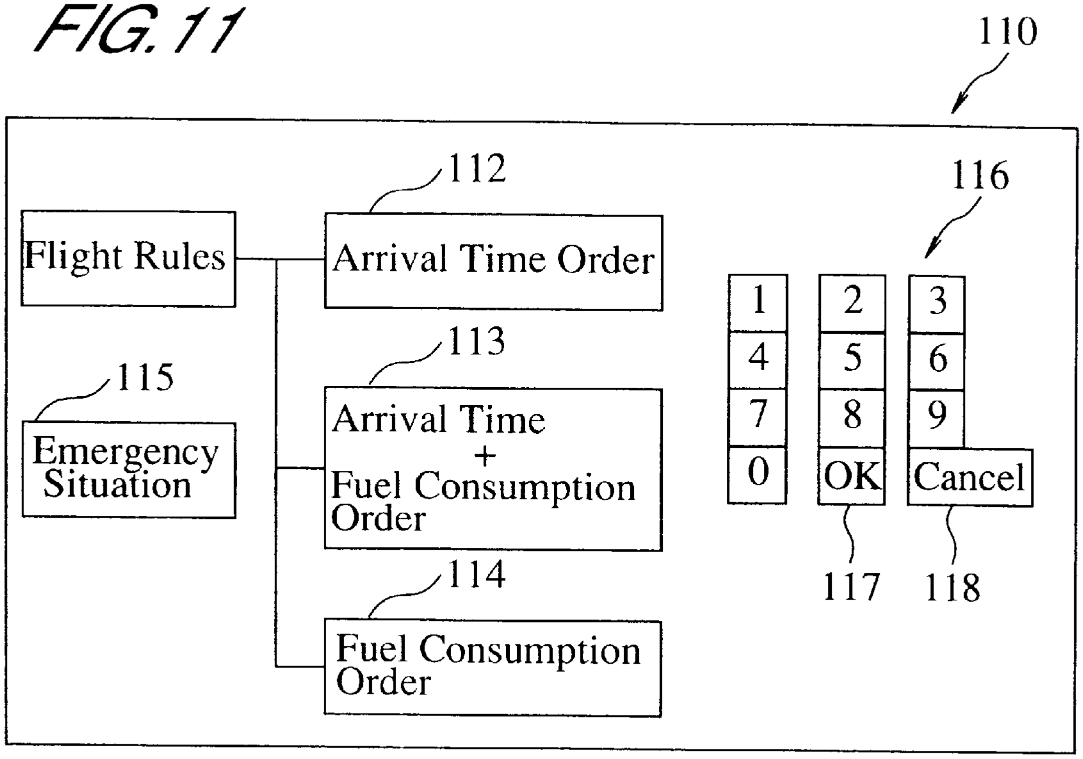
FIG. 11 is a diagram illustrating the input device which a pilot operates when selecting flight rules or in an emergency situation, and depicts an embodiment of the present invention.

FIG. 11 is a diagram illustrating the input device which a pilot operates when selecting flight rules or in an emergency situation, and depicts an embodiment of the present invention.

In FIG. 11, the input device 110 of the aircraft system has an arrival time order operational element 112, an arrival time and fuel consumption operational element 113, a fuel consumption order operational element 114, an emergency situation operational element 115, numerical keys 116, an OK key 117, and a cancel key 118.

Figure 12:
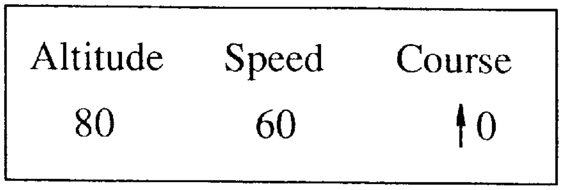
FIG. 12 is a diagram illustrating an example of the flight rules, and depicts an embodiment of the present invention.

For instance, if the arrival time order operational element 112 is selected, as FIG. 12 shows, data is displayed on the aircraft system output unit which allows the aircraft to arrive at its destination as quickly as is possible within the restrictions of the flight rules.

Figure 13:
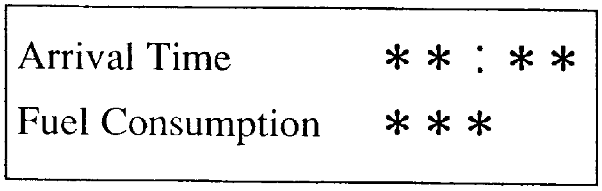
FIG. 13 is a diagram illustrating an example of the display dialogue whereby the pilot confirms the arrival time and fuel consumption settings according to an embodiment of the present invention.
Figure 14:
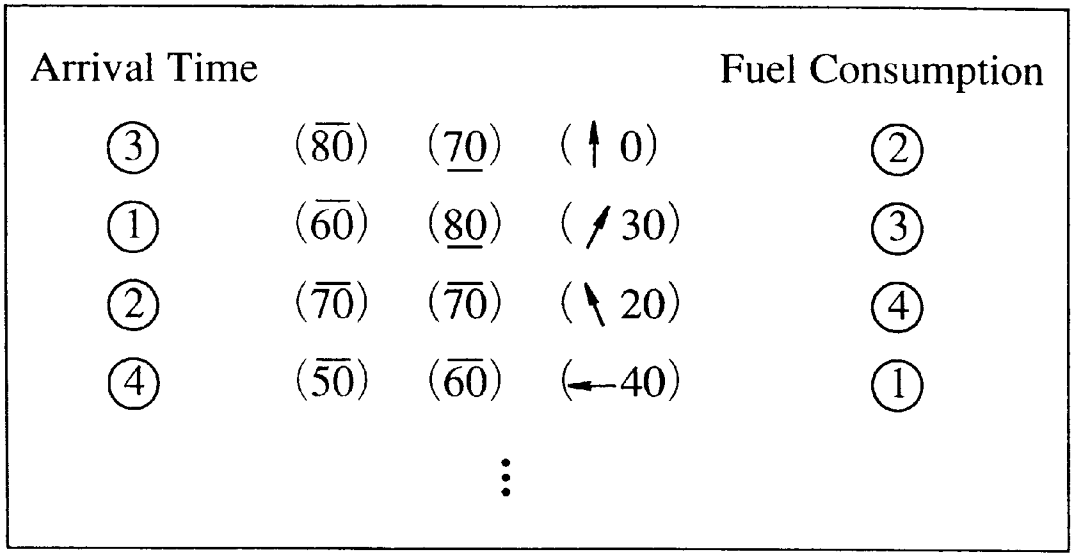
FIG. 14 is a diagram illustrating an example of the flight rules taking into account arrival time and fuel consumption according to an embodiment of the present invention.

Similarly, if the arrival time and fuel consumption operational element 113 is selected, as FIG. 13 shows, an arrival time set confirmation dialogue and a fuel consumption set confirmation dialogue are displayed. If now the arrival time and fuel are input using the numerical keys 1 16, some flight rules which fulfill those conditions of arrival time and fuel consumption are displayed, as is shown in FIG. 14.

Meanwhile, if the fuel consumption order operational element 114 is selected, as FIG. 12 shows, data is displayed on the aircraft system output unit which allows the aircraft to arrive at its destination with the most effective fuel consumption which is possible within the restrictions of the flight rules.

Figure 15:
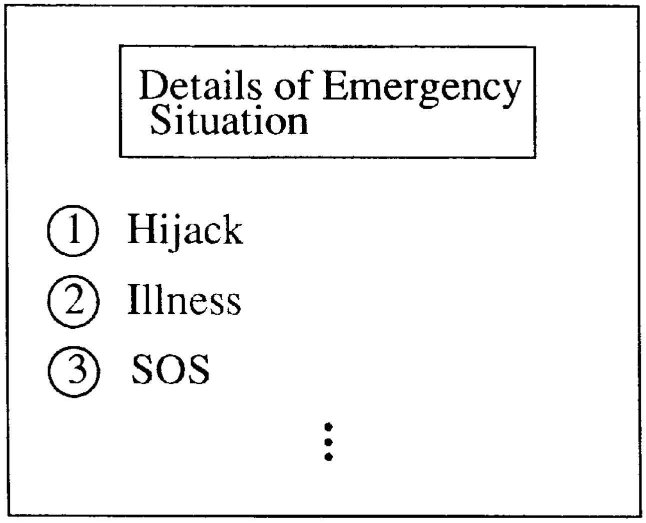
FIG. 15 is a diagram illustrating an example of the screen showing details of an emergency situation in emergency mode of the operational element for use in contacting the air-traffic control system, and depicts an embodiment of the present invention.

Similarly, if the emergency situation operational element 115 is selected, the screen shown in FIG. 15 is displayed. If then the details of the emergency situation are selected with the numerical keys 116, they are transmitted to the air-traffic control system, and flight rules which reflect this are reset in each of the micro air spaces.

Figure 16:
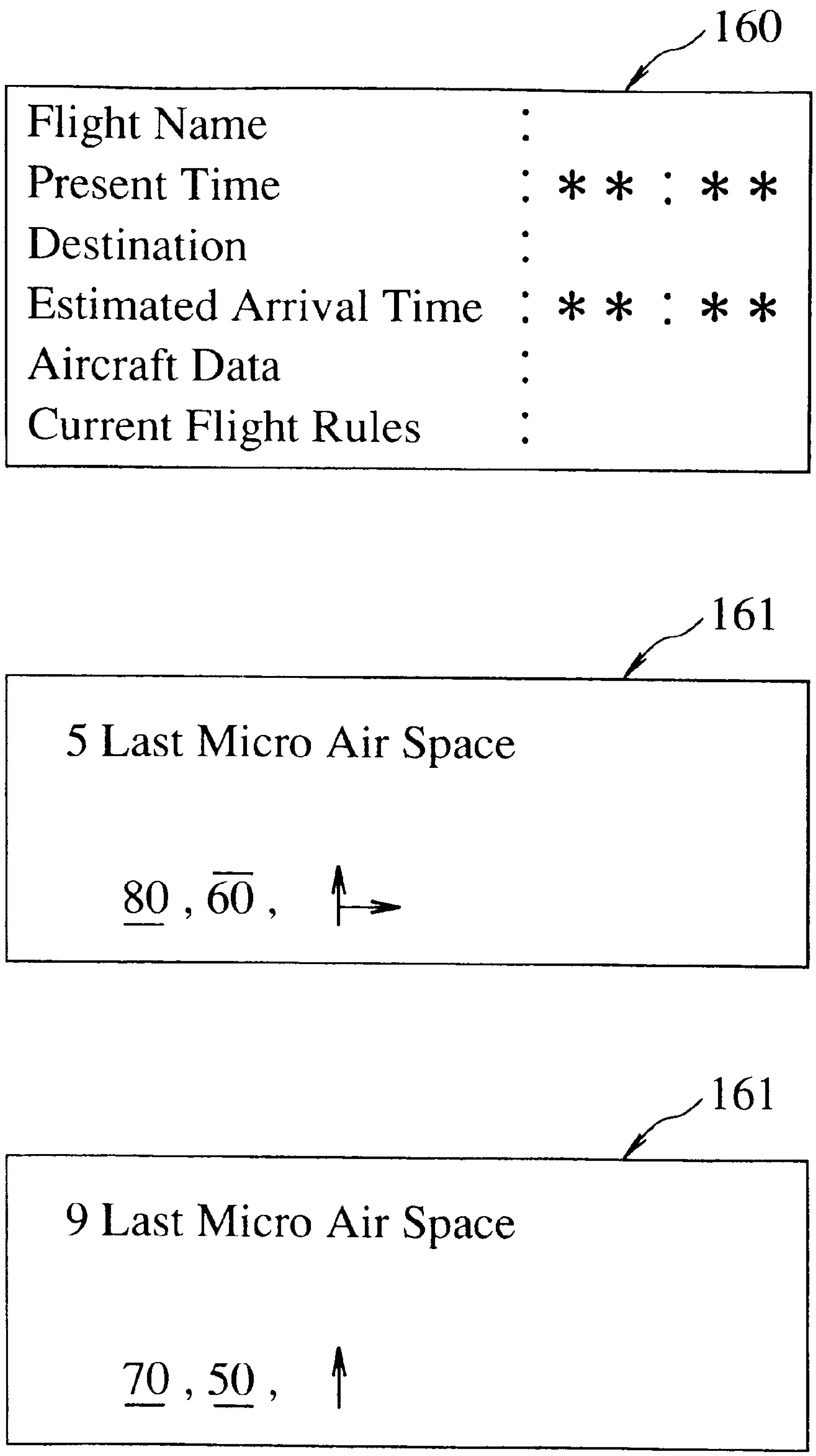
FIG. 16 is a diagram illustrating an example of the data screen of an aircraft, and depicts an embodiment of the present invention.

FIG. 16 illustrates an example of a screen giving details on that aircraft and other items.

As the drawing shows, the screen 160 giving details on the aircraft and other items continually displays the name of the flight, current time, destination, estimated time of arrival, aircraft data, current flight rules and other information. Moreover, the screen 161 displays the flight rules for several micro air spaces ahead after the current flight rules change.

Figure 17A:
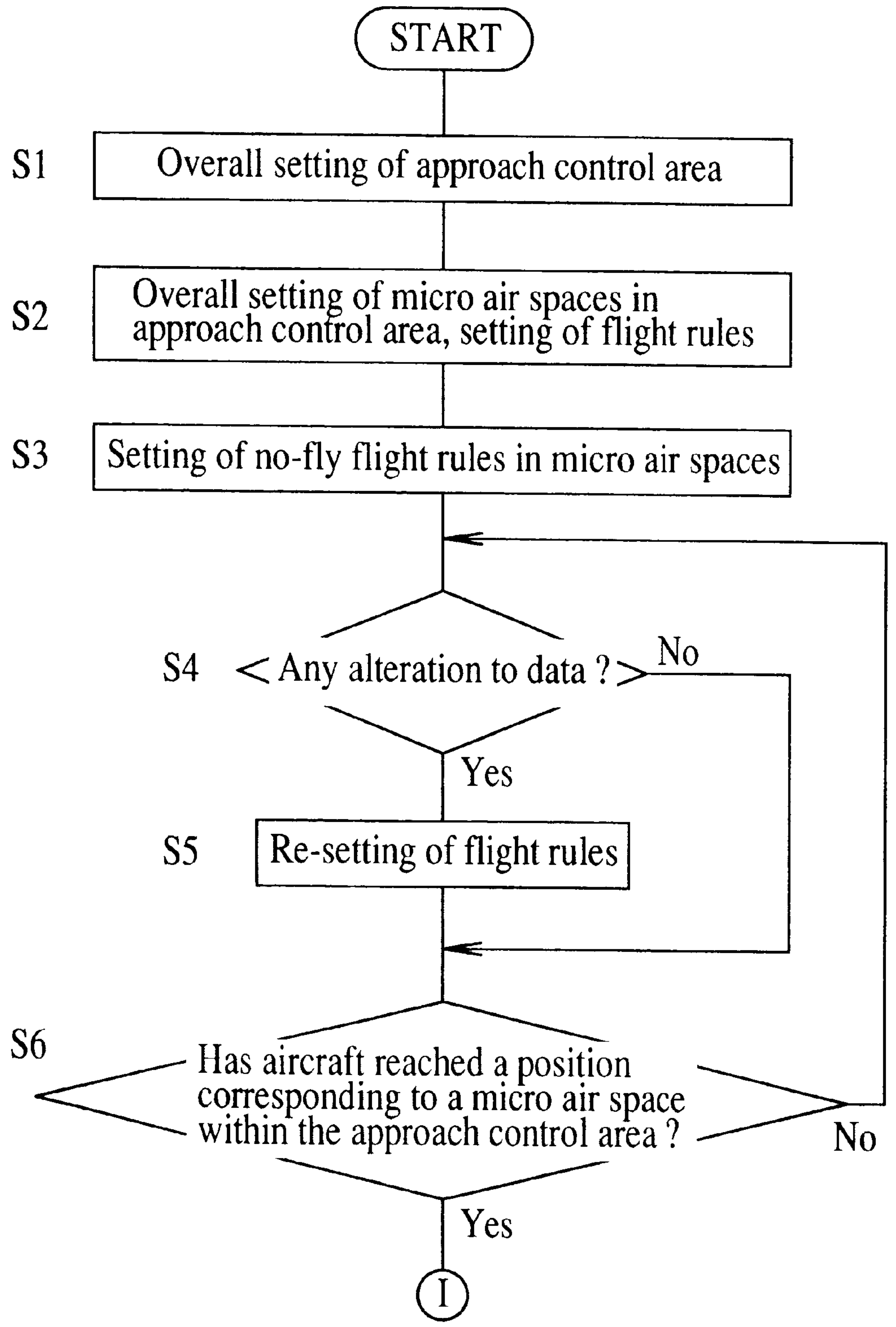
FIGS. 17(A) and 17(B), is a flowchart illustrating the individual guidance system for aircraft in an approach control area under automatic dependent surveillance, and depicts an embodiment of the present invention.
Figure 17B:
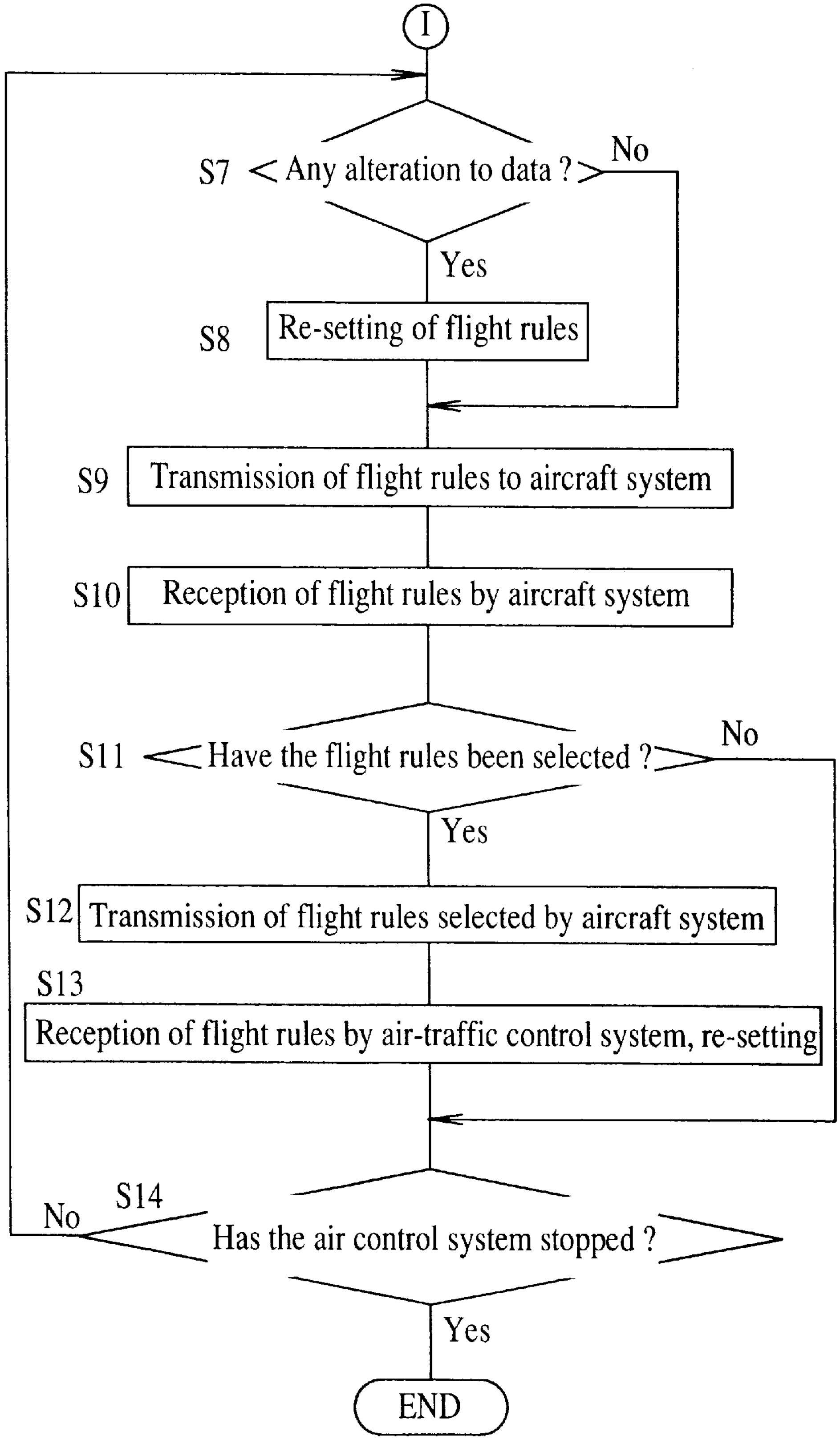
Figure 18:
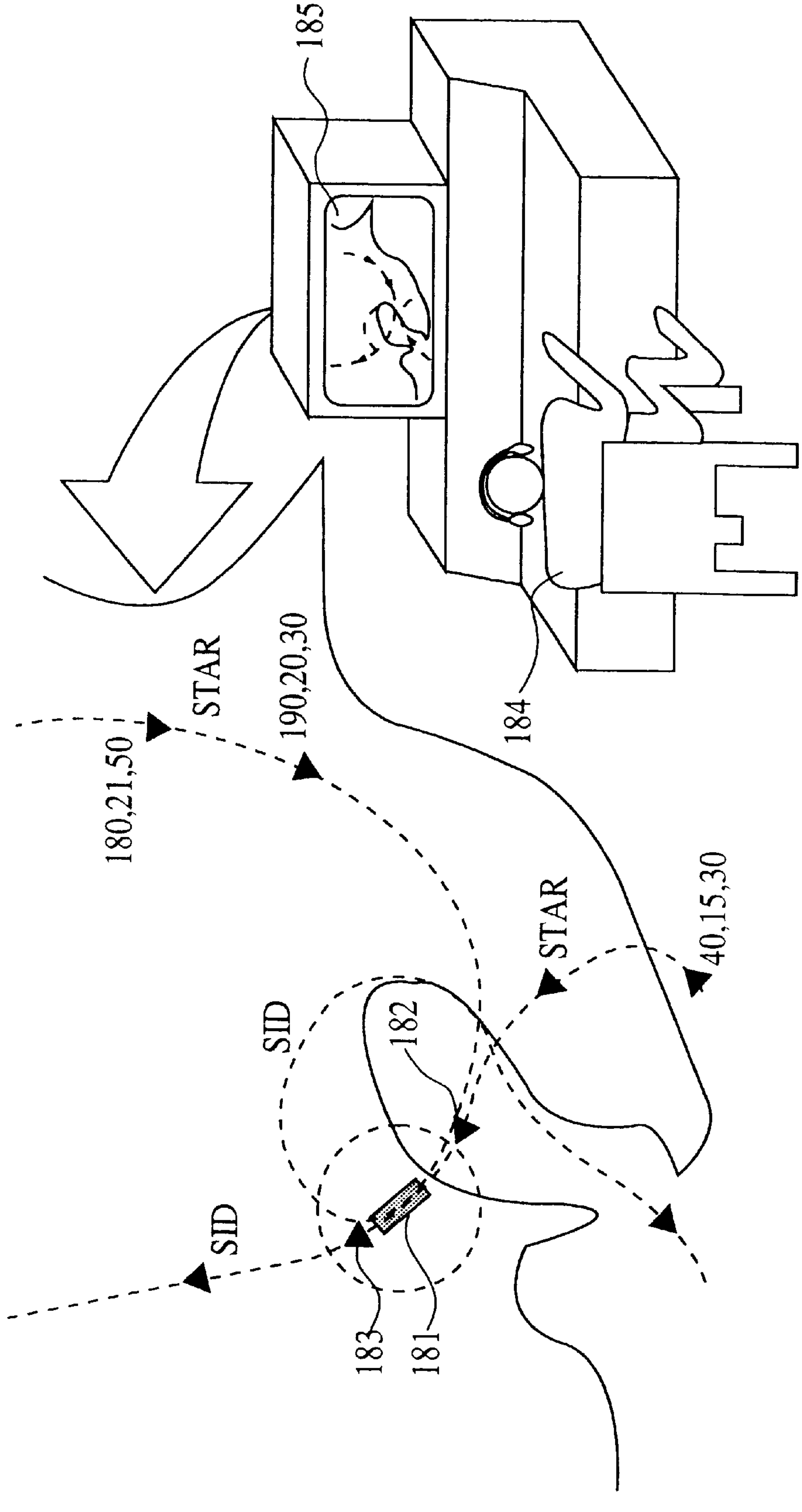
FIG. 18 is an explanatory diagram of outline control in a conventional approach control area.

FIG. 17, including FIGS. 17(A) and 17(B), is a flowchart illustrating the individual guidance system for aircraft in an approach control area under automatic dependent surveillance, and depicts an embodiment of the present invention.

(1) All the settings for the approach control area are implemented by the air-traffic control system (Step S1).

(2) The air-traffic control system sets all the micro air spaces in the approach control area and sets the flight rules (Step S2).

(3) The air-traffic control system sets no-fly areas in the micro air spaces (Step S3).

(4) The air-traffic control system checks to see if there is any alteration to the data (wind direction, emergency situations, current position, altitude and speed of the aircraft, course and any other data which might affect the flight rules) (Step S4).

(5) If the answer to (4) was YES, the air-traffic control system resets the flight rules in the relevant micro air spaces (Step S5). If the answer was NO, proceed to Step S6.

(6) The air-traffic control system checks to see whether the aircraft has reached a position corresponding to a micro air space within the approach control area (Step S6). If the answer was NO, proceed to Step S4.

(7) If the answer to (6) was YES, namely if the aircraft has reached a position corresponding to a micro air space within the approach control area, the air-traffic control system checks to see whether there is any alteration to the data (wind direction, emergency situations, current position, altitude and speed of the aircraft, course and any other data which might affect the flight rules) (Step S7).

(8) If the answer to (7) was YES, the air-traffic control system resets the flight rules in the relevant micro air spaces (Step S8).

(9) If the flight rules were reset in (8), or if the answer to (7) was NO, the flight rules are transmitted to the aircraft system (Step S9).

(10) The aircraft system receives the flight rules on the micro air spaces transmitted from the air-traffic control system by way of the data relay device (e.g., VDL) (Step S10).

(11) The aircraft system checks to see whether or not data within the restrictions of the flight rules has been selected. (Step S11).

(12) If the answer to (11) was YES, the aircraft system transmits the selected data to the air-traffic control system (Step S12). If the answer was NO, proceed to Step S14.

(13) The air-traffic control system receives the relevant flight rules and resets them (Step S13).

(14) The air-traffic control system checks whether to stop or not (Step S14). If the aircraft has not left the approach control area, return to Step S7.

If an emergency situation occurs in the aircraft, the pilot immediately transmits details of the situation to the control desk of the air-traffic controller, who operates the priority operation element, inputs the details of the emergency situation into the air-traffic control system, and returns to Step S5.

In this manner, the embodiment described above:

(1) differs from the conventional method in that the work load on the air-traffic controller is reduced greatly by the fact that detailed safety data is obtained automatically and in real time in the approach control area. This also serves to reduce human error and greatly improve the level of safety.

(2) allows the work load on the air-traffic controller to be reduced greatly because control commands (flight rules) are transmitted automatically and in real time, thus making it unnecessary to issue commands to each aircraft.

(3) will make it possible, at such time as the concept of free flight materialises, for pilots even when within an approach control area to achieve a commonality of awareness with flying through en route air space (the air space outside approach control areas) where they are not restricted by air-traffic controllers.

Moreover, the present invention:

(a) can be applied to air space other than approach control areas, although only its application within the latter has been described here, provided that the area displayed on the aircraft position surveillance screen is altered.

(b) will be capable of application, at such time as the concept of free flight materialises, to approach control areas and other aspects of air-traffic control.

In the above embodiment, communications between the aircraft within the approach control area and the control desk have been implemented without using voice, but it goes without saying that it is also possible to include voice communications in an ancillary role.

Moreover, the present invention is in no way restricted to the above embodiment, and is capable of modification in line with its general gist, such modifications not being excluded from the scope of the present invention.

As has been explained in detail, the present invention enables the following effects to be achieved.

(1) It differs from the conventional method in that the work load on the air-traffic controller is reduced greatly by the fact that detailed safety data is obtained automatically and in real time in the approach control area.

This also serves to reduce human error and greatly improve the level of safety.

(2) It allows the work load on the air-traffic controller to be reduced greatly because control commands (flight rules) are transmitted automatically and in real time, thus making it unnecessary to issue commands to each aircraft.

(3) It will make it possible, at such time as the concept of free flight materializes, for pilots even when within an approach control area to achieve a commonality of awareness with flying through en route air space where they are not restricted by air-traffic controllers.

(4) It allows the air-traffic controllers to concentrate upon priority flights and the setting of no-fly areas.

What is claimed is:

1. An individual guidance system for aircraft in an approach control area under automatic dependent surveillance, wherein:

(a) an air-traffic control system divides the approach control area automatically into a group of micro air spaces;

(b) the air-traffic control system establishes flight rules within said micro air spaces in order to guide aircraft by establishing no-fly air space;

(c) the air-traffic control system, at such time as a change has occurred in weather conditions or other data within the approach control area, establishes in real time in said micro air spaces flight rules, estimated time of landing of the aircraft, estimated time when the aircraft will leave the approach control area and other data in such a manner as to reflect those details;

(d) the air-traffic control system transmits said flight rules automatically to the system of a given aircraft when the aircraft reaches a position which corresponds to said micro air spaces; and (e) the air-traffic control system guides the aircraft in question in accordance with said flight rules which it has transmitted to the system of the aircraft.

2. The individual guidance system for aircraft in an approach control area under automatic dependent surveillance according to claim 1, wherein at such time as within said approach control area a pilot transmits details of an emergency situation or an air-traffic controller notices any abnormality in relation to that aircraft, the flight rules are re-established by inputting the aircraft identification code in such a manner that it is possible to allocate priority to the aircraft in question and to guide it.

3. The individual guidance system for aircraft in an approach control area under automatic dependent surveillance according to claim 1, wherein it has a GUI whereby at such time as within said approach control area there is a new air space which must not be entered, the air-traffic controller establishes a no-fly area, together with the times at which it becomes and ceases to be a no-fly area, by operating a no-fly area establishment control element and surrounding a given area with a rectangle or other shape.

4. The individual guidance system for aircraft in an approach control area under automatic dependent surveillance according to claim 1, wherein it has a GUI whereby surrounding a given air space with a shape by operating a flight rule reference control element allows the air-traffic controller to refer to the flight rules which have been established in each micro air space which lies within that shape.

5. The individual guidance system for aircraft in an approach control area under automatic dependent surveillance according to claim 1, wherein it has a GUI whereby selecting an aircraft within the approach control area on an aircraft position surveillance screen allows the air-traffic controller to refer to the flight rules which have been established in the micro air space which the aircraft in question is entering and in the surrounding micro air spaces.

* * * * *